US007520702B2

(12) United States Patent
Wiehler et al.

(10) Patent No.: US 7,520,702 B2
(45) Date of Patent: Apr. 21, 2009

(54) DRILLING MACHINE

(75) Inventors: Juergen Wiehler, Engstingen (DE); Joerg Bortz, Lichtenstein (DE); Kurt Schellhammer, Rottenburg (DE); Martin Beichert, Suttgart (DE)

(73) Assignee: C. & E. Fein GmbH (DE)

( * ) Notice: Subject to any disclaimer, the term of this patent is extended or adjusted under 35 U.S.C. 154(b) by 386 days.

(21) Appl. No.: 11/174,774

(22) Filed: Jul. 5, 2005

(65) Prior Publication Data

US 2006/0013663 A1  Jan. 19, 2006

(30) Foreign Application Priority Data

Jul. 2, 2004  (DE) ........................ 10 2004 033 361

(51) Int. Cl.
 *B23B 47/18* (2006.01)
(52) U.S. Cl. ...................................... 408/136; 408/132
(58) Field of Classification Search ................ 408/135, 408/136, 152, 161, 129, 153, 158, 168, 179, 408/234, 124, 132
See application file for complete search history.

(56) References Cited

U.S. PATENT DOCUMENTS

| 2,876,663 | A | * | 3/1959 | Buck ............................. 408/76 |
|---|---|---|---|---|
| 2,887,911 | A | * | 5/1959 | Bunting .......................... 408/76 |
| 2,955,491 | A | * | 10/1960 | Buck ............................. 408/76 |
| 3,257,909 | A | * | 6/1966 | Henkel ......................... 409/206 |
| 3,371,257 | A | * | 2/1968 | Warren et al. ................. 318/39 |
| 3,500,707 | A | * | 3/1970 | Warren ......................... 408/135 |
| 3,837,757 | A | * | 9/1974 | Levine .......................... 408/14 |
| 4,559,577 | A | * | 12/1985 | Shoji et al. ..................... 361/31 |
| 4,582,105 | A | * | 4/1986 | Wolff ........................... 144/106 |
| 4,624,607 | A | * | 11/1986 | Kato et al. ..................... 408/1 R |
| 4,741,226 | A | * | 5/1988 | Bernard et al. ................. 74/625 |
| 4,789,274 | A | * | 12/1988 | Shoji et al. ..................... 408/11 |
| 4,932,814 | A | * | 6/1990 | York ............................. 408/1 R |
| 5,007,776 | A | * | 4/1991 | Shoji ............................. 408/6 |
| 5,035,549 | A | * | 7/1991 | Asano et al. ................. 408/132 |
| 5,062,743 | A | * | 11/1991 | Wieland et al. ................. 408/6 |
| 5,087,157 | A | * | 2/1992 | Shoji et al. ..................... 408/9 |
| 5,415,503 | A | * | 5/1995 | Strange et al. ................. 408/76 |
| 6,102,633 | A | * | 8/2000 | Uehlein-Proctor .......... 408/129 |

FOREIGN PATENT DOCUMENTS

DE  24 41 215  5/1975

(Continued)

*Primary Examiner*—Daniel W Howell
(74) *Attorney, Agent, or Firm*—St. Onge Steward Johnston & Reens LLC

(57) ABSTRACT

A drilling machine comprises a stand on which a carriage is guided and can be moved by a drive supported on the stand and engagable with the carriage for generating feed motion of the carriage along the guide. A drilling unit on the carriage includes a motor-driven spindle. An axially-fixed intermediate shaft on the stand engages the carriage and translates rotary motion of the intermediate shaft into linear motion of the carriage along the guide. The drive is engagable with the intermediate shaft for moving the carriage along the guide with a stepper motor. A lever is engagable with an axially-displaceable plunger for shifting the plunger between first and second positions corresponding to an engaged position and a disengaged position, in which the plunger allows for manual rotation of the intermediate shaft when rotating the lever.

7 Claims, 3 Drawing Sheets

FOREIGN PATENT DOCUMENTS

| DE | 37 08 038 A1 | 9/1987 |
| DE | 40 19 515 A1 | 1/1991 |
| JP | 62271614 A * | 11/1987 |
| JP | 08108306 A * | 4/1996 |
| JP | 11254216 A * | 9/1999 |

* cited by examiner

DRILLING MACHINE

This application claims priority from German Patent Application No. 10 2004 033 361.0 filed on Jul. 2, 2004.

BACKGROUND OF THE INVENTION

The invention is directed to a drilling machine, in particular a core drilling machine, comprising a stand, whereon a carriage is guided, the carriage being movable along a guide by means of a drive in a working direction, wherein on the carriage a drilling unit is supported that comprises a spindle being driven by a motor for driving a drilling tool.

From German patent application DE 4 019 515 A1 a magnetic stand drilling unit is known which comprises a frame and a magnetic stand which attaches magnetically to a drilling work piece, further comprising an electric drilling machine having a motor and a feed motor designed as a DC motor being supported on the frame for feeding the drill toward the work piece and for returning there from, wherein a control is provided comprising a sensing means for sensing the completion of a bore drilling operation on the work piece, further comprising feed reversing motor means for reversing the motion direction of the feed motor, as well as safety switching means for deactivating the drilling motor and the feed motor when sensing an overload state.

By using such a control an overload state can be avoided, however the design is relatively costly and complicated.

In a drilling machine known from German patent application DE 3 708 038 A1 a drilling head is provided, a drive motor coupled with the drilling head for driving operation, a power supply means for supplying power to the drive motor, and a feed motor being designed as a series motor for displacing the drilling head relatively to the work piece.

Again, for avoiding an overload state a control means is provided having a sensing means for sensing the current fed to the drive motor, a storage means for storing a current level which is sensed when the drilling head is not engaged with the work piece, and further comprising a sensing means for determining, whether a drilling operation is completed or not, depending on an actual current level and the stored current level.

Also the design of this drilling machine is relatively costly and complicated.

SUMMARY OF THE INVENTION

It is an object of the invention to disclose a drilling machine that can easily avoid an overload state of the drilling unit caused by a too fast feed operation.

It is a second object of the invention to disclose a core drilling machine configured for generating precise core drillings.

These and other objects of the invention are solved with a drilling machine as mentioned at the outset in that the drive comprises a stepper motor.

Thus the object of the invention is fully achieved.

By using a stepper motor an overloading by a too fast feed motion is avoided in a surprisingly simple way. By contrast to a series motor an overload state of the feed motor is not possible, due to its design. By contrast, the feed motion of a stepper motor is limited when reaching a certain resistance so that, as a consequence of which, also the motor of the drilling unit cannot be overloaded by a too fast feed motion.

According to an advantageous development of the invention the drive is designed for periodically interrupting the feed motion.

In addition, this feature may be further developed in that the drive is designed for periodically returning the carriage oppositely to the working direction.

By these measures it can be reached that chips generated during metal drilling are broken from time to time and are released from the core drilling bore. In this way the drilling operation is improved and problems and danger caused by sharp-edged chips are avoided.

According to another development of the invention the drive can be coupled with an intermediate shaft by means of which the drive can be driven.

Preferably, to this end a worm gear pair is provided by means of which the stepper motor can be coupled with the intermediate shaft.

By these features a suitable reduction of the feed operation is guaranteed and a simple design is made possible.

According to an additional development of this design the worm gear pair can be coupled via the intermediate shaft with a pinion which engages a tooth rod which is provided on the stand.

In this way the feed motion of the stepper motor can be transferred in a suitable way into a feed operation of the carriage along the stand.

According to another development of the invention on the intermediate shaft a plunger is provided which is axially displaceable between a first position, in which a driving movement of the drive is transmitted onto the intermediate shaft by means of the plunger, and between a second position, in which there is no transfer of a rotary motion from the drive to the intermediate shaft.

Herein preferably a lever is coupled with the intermediate shaft allowing a manual rotation of the intermediate shaft.

Thereby it is made possible to allow for a fast manual feed motion of the carriage toward the boring location, in addition to the driving motion generated by the stepper motor. Thereafter, by means of the lever a switching between manual and automatic feed motion generated by the stepper motor can be affected by axially displacing the plunger.

To this end the lever may be configured as a star handle having three articulated gripping parts, displaced by 120° with respect to each other, the ends of which engaging with an end of the plunger to thereby allow an axial shifting of the plunger between the first position and the second position by tilting the gripping parts.

Herein preferably the worm gear pair comprises a worm gear screw driven by the stepper motor and engaging a worm gear wheel which may be coupled with the intermediate shaft for rotating the latter by means of roller bodies.

Herein preferably between the plunger and the intermediate shaft a pressure piece is held by means of which the roller bodies are biased for engaging catching recesses provided on the worm gear wheel.

By these measures a simple switching is made possible between a feed motion generated manually via the lever and between an automatic feed motion generated by the stepper motor. For switching merely the lever or one of the gripping parts of the lever, respectively, must be tilted.

According to a further development of this design the plunger comprises a collar by means of which the roller bodies are displaceable between the first position for catching the intermediate shaft and between the second position in which the intermediate shaft is not carried along by the drive.

Herein between the collar and a stop surface on the intermediate shaft a spring element may be held for biasing the plunger into the second position.

According to another preferred development of the invention the drilling unit comprises a three-speed gear for driving the drilling tool.

Thereby an improved adaptation of the drilling tool rate to various operating conditions is made possible.

It will be understood that the afore-mentioned features of the invention and the features to be described hereinafter cannot be used only in the given combination but also in other combinations or on their own, without going beyond the scope of the invention.

BRIEF DESCRIPTION OF THE DRAWINGS

Further features and advantages of the invention will be apparent from the following description of a preferred exemplary embodiment of the invention when taken in conjunction with the drawings. In the drawings show.

DETAILED DESCRIPTION OF THE PREFERRED EMBODIMENTS

Figure 1:
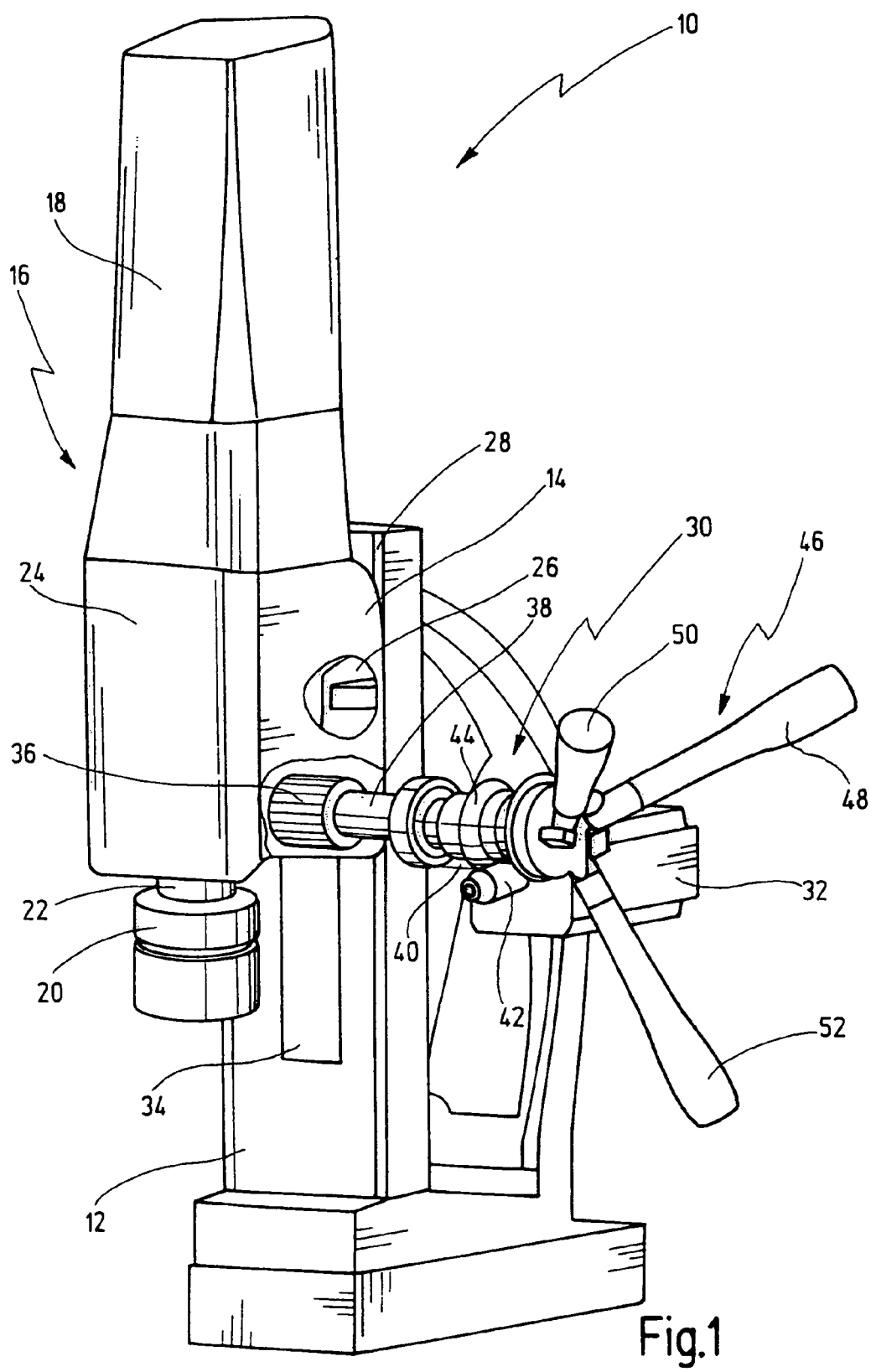
FIG. 1 a perspective view of a drilling machine according to the invention, wherein, for ease of better understanding, the outer parts are cut free in the region of the intermediate shaft for transferring the rotary motion of the feed drive onto the carriage.

In FIG. 1 a drilling machine according to the invention is depicted in general with numeral 10.

The drilling machine 10 according to the invention is configured as a core drilling machine comprising a stand 12, wherein a drilling unit 16 is received on a carriage 14 which can be moved by means of a drive 30 along a guide 28.

The drilling unit 16 comprises a motor 18 designed as a universal motor which drives a spindle 22 for driving a drilling tool 20 by means of a three-speed gear 24. To adjust the different gear ratios, a selecting lever 26 is received rotatably on the housing of the drilling unit 16.

For feeding the drilling unit 16 or the carriage 14, respectively, on the carriage 14 a tooth rod 34 is received which can be driven by means of a pinion 36 received rotatably on the stand 12, as will be explained in detail hereinafter.

The pinion 36 can either be automatically driven by a drive 30 comprising a stepper motor 32, or can be manually driven by means of a star handle 46. To allow for a switching between an automatic feed operation by the stepper motor 32 and between a manual feed operation by means of the star handle 46, an axially displaceable plunger 62 is coupled with the intermediate shaft 38. The star handle 46 comprises three gripping parts 48 arranged offset by 120° with respect to one another and arranged pivotably and being coupled with the intermediate shaft 38 for common rotation therewith. It can be seen from FIG. 2 that the gripping parts 48, 52 are held pivotably by means of pins 56 at their ends 49 and 53, respectively, on associated supports 54. The ends 49 and 53, respectively, of the gripping parts 48 and 52, respectively, cooperate with an axial end 70 of the plunger 62. By tilting one of the gripping parts 48, 50, 52 the plunger 62 can be axially shifted between a first position and between a second position shown in FIG. 2, as indicated by the double arrow 64. In both positions a rotary motion of the star handle 46 or of the individual gripping parts 48, 50, 52, respectively, is transferred onto the intermediate shaft 38, and thus is transferred into a displacement of the drilling unit 16. While in the second position of the plunger 62, shown in FIG. 2, a feed motion generated by stepper motor 62 is not transferred onto the intermediate shaft 38, by contrast, in the first position the intermediate shaft 38 is carried along, when the stepper motor 32 is operated.

The stepper motor 32 can be coupled with the intermediate shaft 38 by means of a worm gear pair 40. To this end by stepper motor 32 a worm gear screw 42 is driven which engages a worm gear wheel 44 which is held rotatably on the intermediate shaft 38. For transferring a rotary motion of the worm gear wheel 44 onto the intermediate shaft 38, the worm gear wheel 44 comprises catching recesses 76 which are engaged by roller bodies 66 designed as balls, to provide a positive connection between the worm gear wheel 44 and intermediate shaft 38. While the roller bodies 66 in the second position according to FIG. 2 merely revolve on a peripheral groove of the plunger 62, in the first position of the plunger 62 the roller bodies 66 can be pressed radially to the outside by means of a spring-biased pressure piece 78, until they are carried along by the catching recesses 76 of the worm gear wheel 44 for positive engagement with the intermediate shaft 38. Thus, if the plunger 62 is in the first position, then a rotary motion exerted by the stepper motor 32 and transferred onto the worm gear wheel 44 is transferred into a rotary motion of the intermediate shaft 38. In this case the star handle 46 also rotates, when the stepper motor 32 is driven.

By contrast, when the plunger 62 is in its second position, then the intermediate shaft 38 can only be rotated manually by means of the star handle 46, to thus allow a manual adjustment of the drilling unit 16, and hence, in particular a manual feed motion toward a work piece to be bored. Thereafter the plunger 62 is moved into the first position by pivoting one of the gripping parts 48, 50, 52, until the roller bodies 66 are biased toward the catching recesses 76 by means of the pressure piece 78 and can engaged therewith to carry along the intermediate shaft 38 and thus the pinion 36.

The drive designed as a stepper motor 32 for automatically feeding the drilling unit 16 allows an automatic feed motion of the drilling unit 16 without any possible overload state.

Figure 2:
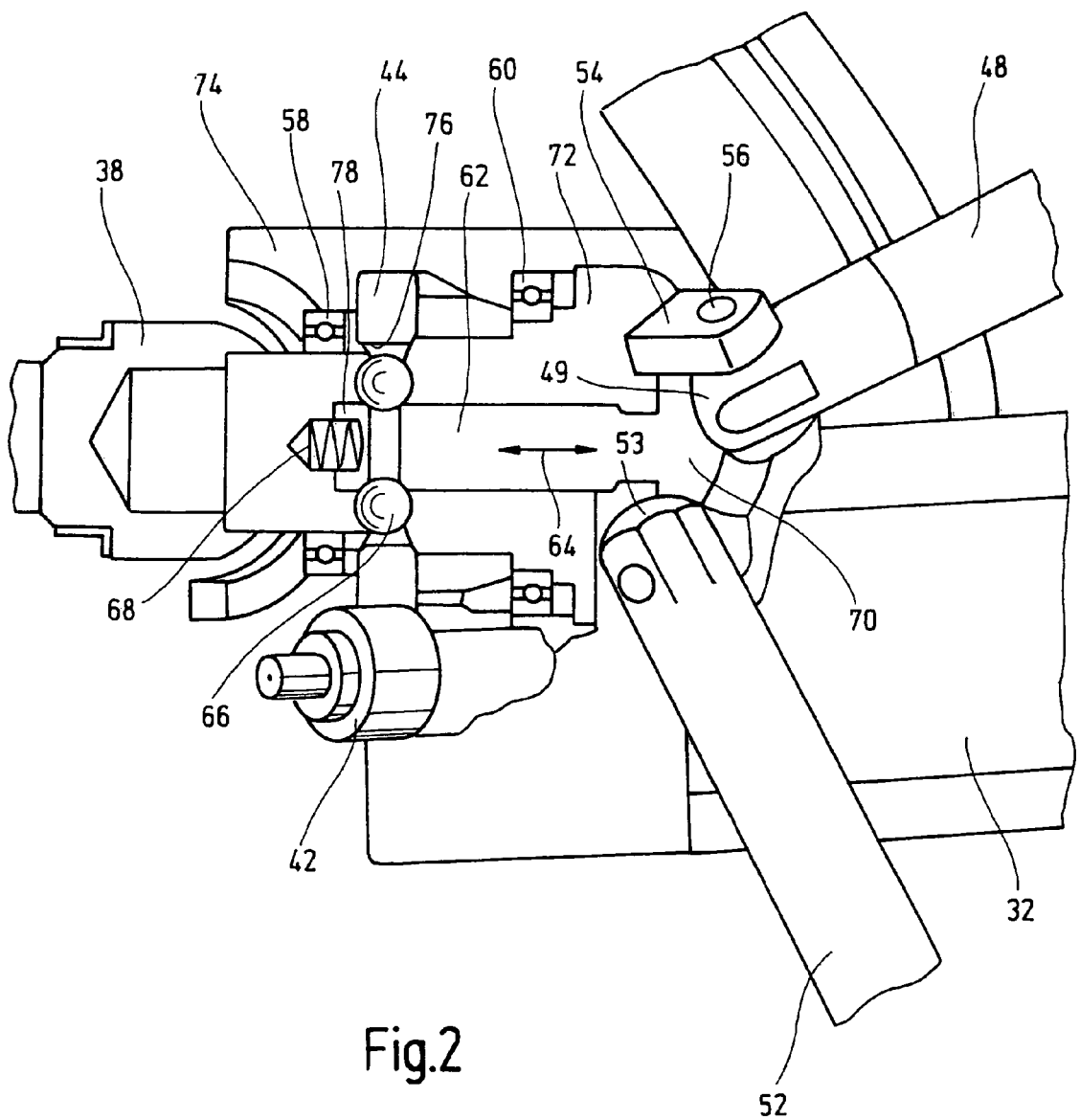
FIG. 2 an enlarged partially sectioned view of the intermediate shaft shown in the region of the worm gear pair, together with associated gripping parts of the lever for manual drive operation.

Also it can be seen from FIG. 2, how the plunger 62 is held rotatably by means of two bearings 58, 60 via an intermediate part 72 on a housing part 74 which is attached to stand 12 and connected with the stepper motor 32.

Figure 3:
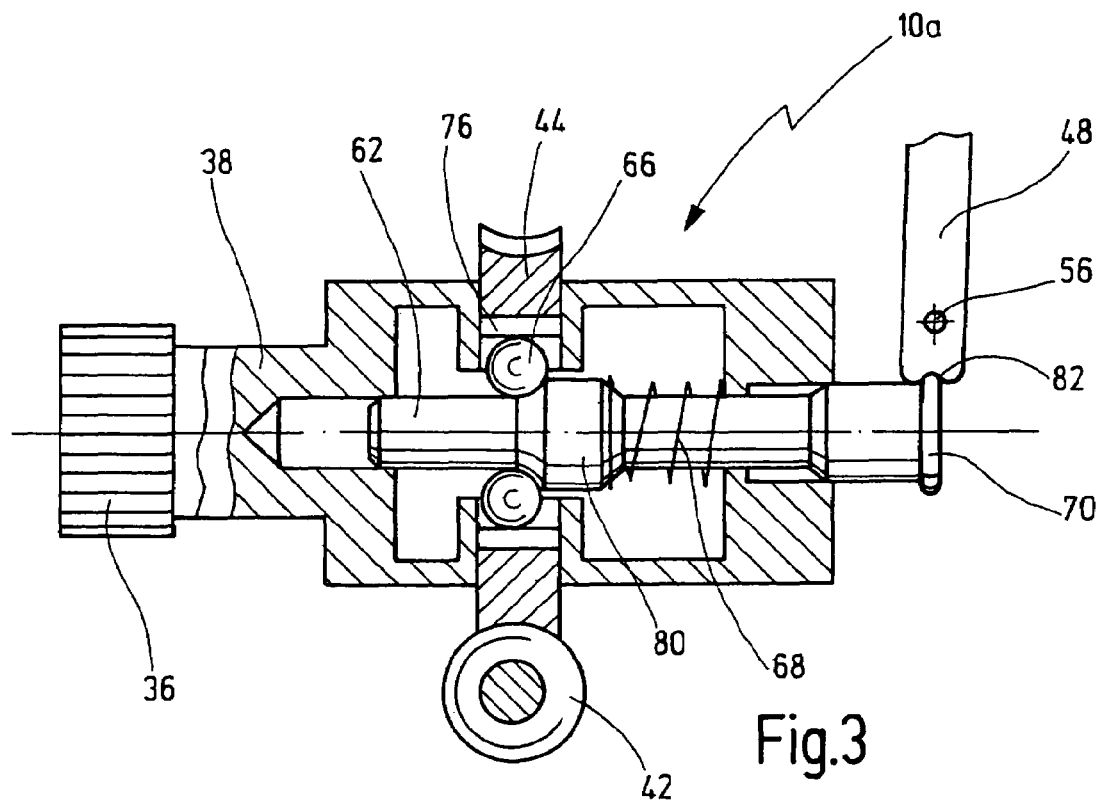
FIG. 3 an enlarged sectional view of the intermediate shaft shown in the region of the worm gear pair, in a design modified with respect to the design of FIG. 2, shown in a position in which there is no entrainment between the worm gear pair and the intermediate shaft.
Figure 4:
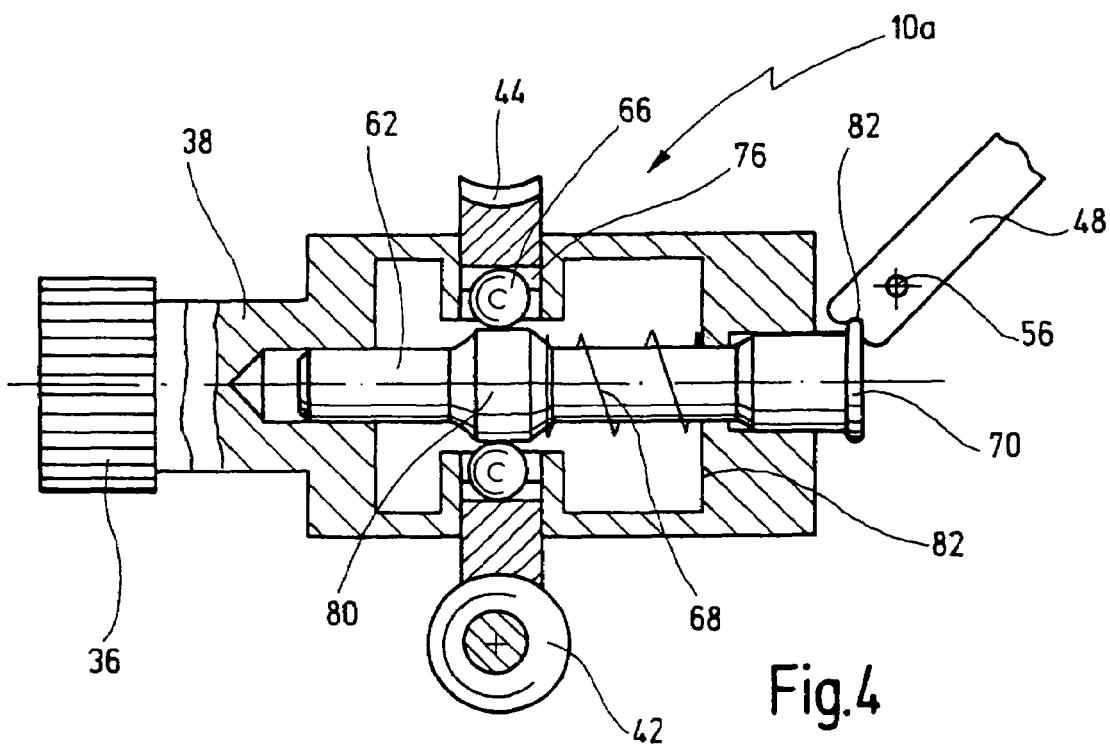
FIG. 4 a modified position of the embodiment according to FIG. 3 in which there is an entrainment between the worm gear pair and the intermediate shaft.

In FIGS. 3 and 4 a modified embodiment of the drilling machine is partially depicted and designated in total with 10a. Herein for corresponding parts like reference numerals are used.

The principle of a switching between an entrainment position in which a rotary motion of the worm gear pair is transferred into a rotary motion of the intermediate shaft 38, and between a position in which there is no entrainment, remains unchanged. By contrast to the embodiment according to FIGS. 1 and 2, now a spring element 68 for biasing the intermediate shaft 38 toward the other side of the worm gear pair 40 is held between a stop surface 82 of the intermediate shaft 38 facing away from the pinion 36, and between a collar 80 on the intermediate shaft 38. The spring element 68 biases the plunger 62 into the position shown in FIG. 4. In this position the gripping parts 48 of the star handle are tilted, and the roller bodies 66 engage into recesses 76 provided on the worm gear wheel 44, to thus allow an entrainment between worm gear wheel 44 and intermediate shaft 38.

By contrast, as depicted in FIG. 3, the roller bodies 66 on the outer surface of plunger 62 rest against collar 80 so that there is no entrainment between the worm gear wheel 44 and intermediate shaft 38. In this position the gripping parts 48 of the star handle are almost vertical. At the end of each gripping part 48 a catch recess 82 is provided that cooperates with a collar 70 at the end of plunger 62 for catching operation.

What is claimed is:

1. A drilling machine comprising:
    a stand;
    a carriage guided on said stand along a guide provided on said stand;
    a drive supported on said stand and being engagable with said carriage for generating a feed motion moving said carriage in a working direction along said guide;
    an axially-fixed intermediate shaft arranged on said stand and engaging said carriage for translating a rotary motion of said intermediate shaft into a linear motion of said carriage along said guide;
    wherein said drive is engagable with said intermediate shaft for moving said carriage along said guide via a worm gear pair for driving said intermediate shaft and being engagable with said drive for rotating said intermediate shaft, wherein said worm gear pair comprises a worm gear screw driven by said stepper motor and engaging a worm gear wheel which is engagable with said intermediate shaft for transferring a rotation of said worm gear screw into a rotation of said intermediate shaft,
    a plurality of roller bodies arranged displaceably between said first and second positions, said roller bodies engaging said worm gear screw and said intermediate shaft when being in said first position for transferring a rotation of said drive into a rotation of said intermediate shaft and for allowing free rotation of said intermediate shaft independently from said drive when being in said second position;
    a plunger being supported on said intermediate shaft and being axially displaceable between first and second positions;
    a lever being engagable with said plunger for shifting said plunger between said first and second positions, wherein said lever is configured as a star handle having three articulated gripping parts, each handle part having an end engaging one end of said plunger to thereby allow to axially shift said plunger between said first and second positions when tilting said gripping parts;
    a spring element held between said plunger and said intermediate shaft for biasing said roller bodies for engaging into catching recesses provided on said worm gear wheel for positively catching the intermediate shaft when being in said first position;
    wherein said lever is movable between an engaging position in which said plunger is located in said first position, and between a disengaged position, in which said plunger is in said second position allowing for a manual rotation of said intermediate shaft when rotating said lever; and
    a drilling unit supported on said carriage and comprising a spindle being driven by a motor for driving a drilling tool;
    wherein said drive comprises a stepper motor.

2. The drilling machine of claim 1, wherein said drive is controlled for periodically interrupting said feed motion.

3. The drilling machine of claim 2, wherein said drive is configured for periodically returning said carriage oppositely to said working direction.

4. The drilling machine of claim 1, further comprising:
    a pinion driven by said intermediate shaft; and
    a tooth rod provided on said carriage and engaging said pinion.

5. The drilling machine of claim 1, wherein said plunger comprises a collar engaging said roller bodies to thereby allow displacing said roller bodies between said first position for catching the intermediate shaft and between said second position in which said intermediate shaft is not entrained by said worm gear wheel.

6. The drilling machine of claim 1, further a spring element is held between said collar and a stop surface provided on said intermediate shaft for biasing said plunger into said second position.

7. The drilling machine of claim 1, wherein said drilling unit comprises a three-speed gear for driving the drilling tool.

* * * * *